(12) United States Patent
Peruru et al.

(10) Patent No.: US 9,319,863 B2
(45) Date of Patent: Apr. 19, 2016

(54) SYSTEM AND METHODS FOR INCREASING EFFICIENCY OF A PUBLIC LAND MOBILE NETWORK SEARCH IN SERVICE ACQUISITION ON A MULTI-SIM WIRELESS DEVICE

(71) Applicant: QUALCOMM Incorporated, San Diego, CA (US)

(72) Inventors: Praveen Peruru, Hyderabad (IN); Karthikeyan Sabapathi, Hyderabad (IN); Narendra Pulicherla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 14/248,474

(22) Filed: Apr. 9, 2014

(65) Prior Publication Data

US 2015/0296364 A1 Oct. 15, 2015

(51) Int. Cl.
| H04W 8/00 | (2009.01) |
| H04W 60/00 | (2009.01) |
| H04W 88/06 | (2009.01) |
| H04W 48/18 | (2009.01) |

(52) U.S. Cl.
CPC ............. *H04W 8/005* (2013.01); *H04W 48/18* (2013.01); *H04W 60/005* (2013.01); *H04W 88/06* (2013.01)

(58) Field of Classification Search
CPC ... H04W 8/005; H04W 60/005; H04W 88/06; H04W 88/02; H04W 60/04; H04W 60/00
See application file for complete search history.

(56) References Cited

U.S. PATENT DOCUMENTS

| 8,135,405 | B2 | 3/2012 | Mittal et al. |
| 8,170,616 | B2 | 5/2012 | Lee |
| 8,433,318 | B2 | 4/2013 | Krishnamoorthy et al. |
| 8,543,109 | B2 | 9/2013 | Kim et al. |
| 8,554,167 | B2 * | 10/2013 | Geary ................... G06F 1/3209 370/311 |
| 9,049,647 | B1 * | 6/2015 | Ravuvari ............... H04W 8/183 |
| 2007/0211669 | A1 | 9/2007 | Umatt et al. |
| 2010/0020725 | A1 | 1/2010 | Ha et al. |
| 2010/0273524 | A1 * | 10/2010 | Bae ....................... H04W 48/16 455/552.1 |
| 2012/0135715 | A1 | 5/2012 | Kang et al. |
| 2013/0012135 | A1 | 1/2013 | Ruohonen et al. |

(Continued)

FOREIGN PATENT DOCUMENTS

| EP | 2469897 B1 | 10/2012 |
| WO | 2013085541 A1 | 6/2013 |

OTHER PUBLICATIONS

International Search Report and Written Opinion—PCT/US2015/017567—ISA/EPO—May 20, 2015.

*Primary Examiner* — Marisol Figueroa
(74) *Attorney, Agent, or Firm* — The Marbury Law Group, PLLC

(57) ABSTRACT

Methods and devices are disclosed for enabling improved service acquisition on a first SIM of a multi-SIM wireless communication device. After the first SIM has lost service, the wireless device may detect a condition triggering a public mobile land network (PLMN) selection associated with the first SIM, receive an indication that service acquisition settings of the first SIM are set to a manual mode, and determine whether the second SIM is in idle mode. Upon determining that the second SIM is in idle mode, the wireless device may identify timing of a sleep cycle implemented by the second SIM, and perform the PLMN search using the first and second radio resources.

25 Claims, 7 Drawing Sheets

(56) References Cited

U.S. PATENT DOCUMENTS

| | | |
|---|---|---|
| 2013/0329639 A1 | 12/2013 | Wietfeldt et al. |
| 2014/0036710 A1 | 2/2014 | Chin et al. |
| 2015/0126187 A1 * | 5/2015 | Ponukumati .......... H04W 72/02 455/434 |
| 2015/0282057 A1 * | 10/2015 | Li .......................... H04W 48/18 455/552.1 |

* cited by examiner

SYSTEM AND METHODS FOR INCREASING EFFICIENCY OF A PUBLIC LAND MOBILE NETWORK SEARCH IN SERVICE ACQUISITION ON A MULTI-SIM WIRELESS DEVICE

BACKGROUND

Wireless communications devices may employ a variety of methods for achieving a network connection after initial power up or out-of-service conditions on the device. For example, a wireless device may scan the local wireless environment to detect radio frequencies corresponding to particular networks, and select suitable cells in those networks based on any of a number of prioritization factors (e.g., recency of use, preference set forth by the service provider, etc.) In a typical arrangement, a device may store a list of networks set by the service provider, a list of frequency bands supported by the device, and a list of channels within each supported band.

Multi-SIM (subscriber identification module) wireless devices have become increasing popular because of their flexibility in service options and other features. One type of multi-SIM wireless device, a dual-SIM dual active (DSDA) device, allows simultaneous active connections with the networks corresponding to two SIMs. DSDA devices typically have separate transmit/receive chains associated with each SIM. Another type of multi-SIM wireless device, a dual-SIM dual standby (DSDS) device, allows selective communication on a first network while listening for pages on a second network.

In various types of multi-SIM wireless communication devices, each modem stack associated with a subscription may store information provisioned by its respective network operator, and may independently perform idle mode tasks required for service acquisition. Consequently, each modem stack associated with a SIM may separately perform processes including scanning the local wireless environment on frequencies of previously-acquired broadcast channels, scanning the local wireless environment on frequencies in supported bands, measuring signal strength on detected channels, and reading system information, including PLMN identifiers, on broadcast channels. Since each SIM may perform these tasks according to its own network status and configuration, despite capabilities and/or other available resources of the device, system acquisition may be prolonged and power consumption may be increased.

SUMMARY

Systems, methods, and devices of various embodiments enable a multi-SIM wireless communication device on which a first SIM is out-of-service to improve service acquisition by detecting a condition triggering a public mobile land network (PLMN) selection associated with the first SIM, in which the first SIM is associated with a first radio resource, receiving an indication that service acquisition settings of the first SIM are set to a manual mode, and determining whether a modem stack associated with a second SIM of the device is in idle mode, in which the second SIM is associated with a second radio resource. Embodiment methods may also include, identifying timing of a sleep cycle implemented by the modem stack associated with the second SIM in response to determining that the modem stack associated with the second SIM is in idle mode, and performing a PLMN search using the first and second radio resources.

In some embodiment systems, methods and devices, performing the PLMN search may include determining whether the first SIM supports multiple radio access technologies. Embodiment methods may also include, assigning frequencies associated with a first one of the multiple radio access technologies to the first SIM in response to determining that the first SIM supports multiple radio access technologies, and assigning frequencies associated with a second one of the multiple radio access technologies to the second SIM.

In some embodiment systems, methods and devices, performing the PLMN search may include scanning, by the first radio resource, a first set of assigned frequencies to identify channels that satisfy a signal strength threshold, scanning, by the second radio resource during a sleep period of the power-saving mode cycle, a second set of assigned frequencies to identify channels that satisfy the signal strength threshold, receiving a first group and a second group of identified PLMNs based on system information read from each identified channel in the respective first set and second set of assigned frequencies, determining whether all frequencies in the first and second sets of assigned frequencies have been scanned, generating a combined list of PLMNs based on the first and second groups of identified PLMNs in response to determining that all frequencies in the first and second sets of assigned frequencies have been scanned, and outputting the combined list of PLMNs.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
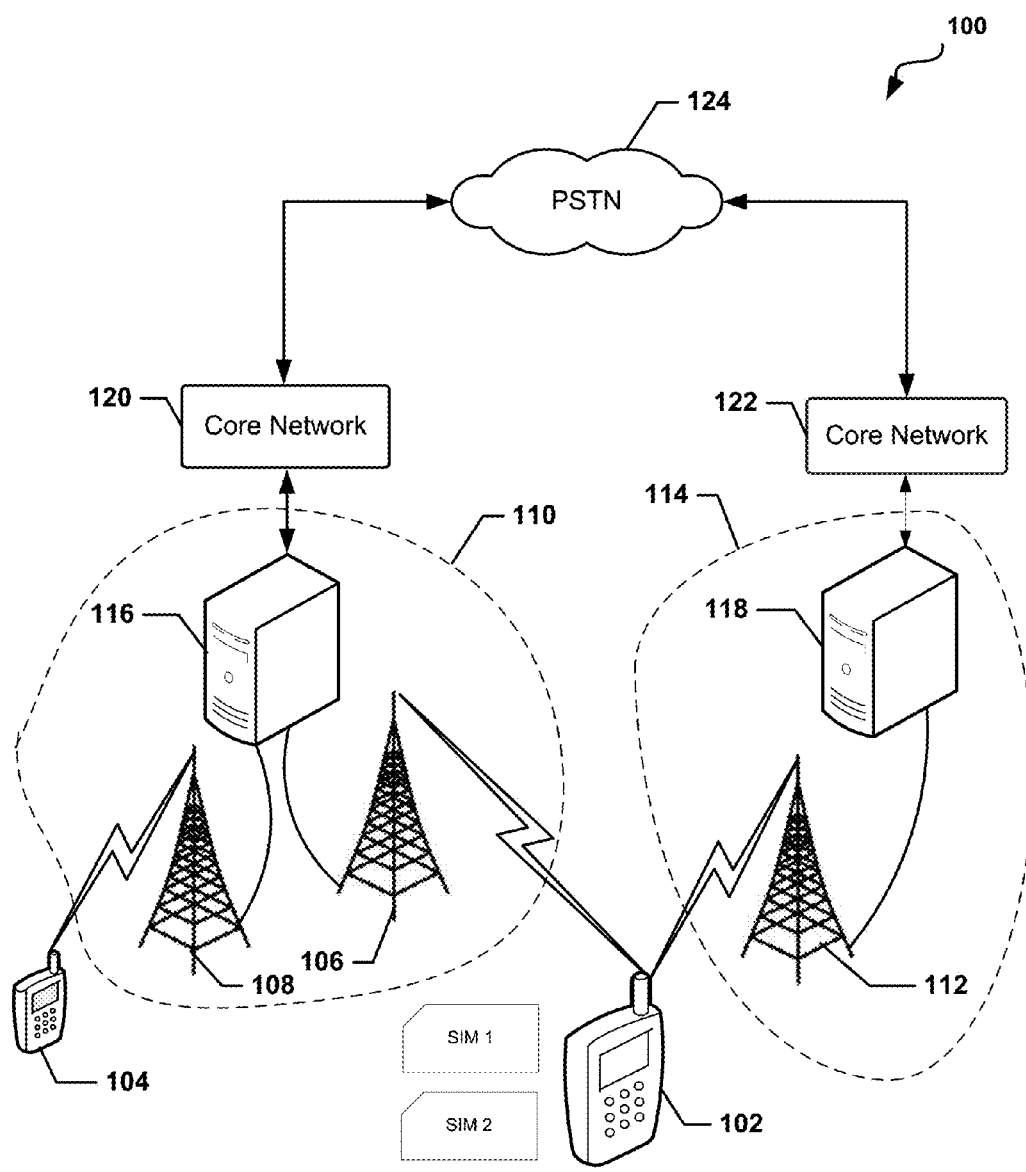
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The terms "wireless device" and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual active device," and "DSDA device" are used interchangeably to describe a wireless device that is configured with more than one SIM and is capable of independently handling communications with networks of all subscriptions.

As used herein, the terms "wireless network," "cellular network," "system," "public land mobile network," and "PLMN" are used interchangeably to describe a wireless network of a carrier associated with a wireless device and/or subscription on a wireless device, and/or its roaming partners.

As used herein, the terms "cell," "cell frequency," "BCCH carrier frequency," "frequency channel," and "cell channel" are used interchangeably to describe a base frequency signal which a network broadcasts from a base transceiver station (BTS), radio base station (RBS), or node B in order to advertise its presence, operator identity, and other necessary initial information.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type and/or UMTS-type networks, but may be applied to networks using any other radio technology or protocol.

A public land mobile network (PLMN) is communications network that is established by a wireless service carrier/service provider to provide land communication services to the public. When there are several PLMNs deployed in the same region, the areas covered by their networks may overlap. In typical wireless communications, a PLMN may operate on one or multiple frequency bands, and each wireless network within a PLMN may operate on one or more specific RF channels within a specific frequency band. Each RF channel is generally identified by a unique number, for example, an absolute radio frequency channel number (ARFCN) in a GSM PLMN, or a UTRA ARFCN (UARFCN) in a UMTS PLMN. A PLMN may include cells that use one or many different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1xEV technology).

An example GSM network may operate on any of a number of GSM bands (e.g., GSM 900, GSM 850, etc.), each of which cover multiple radio frequency (RF) channels identified by ARFCNs The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band. In describing various embodiments, the terms "channel," "frequency," and "ARFCN" may be used interchangeably and may refer to channels in GSM bands, and/or channels in other network bands (i.e., UARFCNs for UMTS networks, etc.).

A multi-SIM wireless device, which supports two or more SIM cards, may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-SIM dual active" (DSDA) wireless device in which two SIMs are configured to use separate transceivers (i.e., radio resources). Thus, in a DSDA device the SIMs may simultaneously operate in any of a variety of modes, such as active/connected mode (i.e., transmitting and/or receiving data), idle mode, etc. Other multi-SIM wireless communication devices may be configured to operate more than two SIMs in simultaneous active connections, such as by providing a separate transceiver for each of at least three SIMs. The SIMs in a multi-SIM wireless communication device may be associated with the same or different PLMNs, each of which may have more than one wireless network. Each SIM is generally provisioned by a service provider with a list of preferred PLMNs from which it can receive service (i.e., a home PLMN and roaming partner PLMNs).

Although multi-SIM wireless communication devices offer a variety of options to the end user, they also necessitate efficient execution of complex tasks. In multi-SIM resource management, multiple SIMs may generally be handled separately with respect to out-of-service recovery and power-up scenarios. In particular, DSDA devices generally have separate modem stacks to operate using their respective radio resources.

In operation, once powered on and/or recovering service, a conventional wireless device may find PLMNs for a particular radio access technology (e.g., GSM) by scanning and measuring signal strength on the channels of each enabled frequency band, and may identify those channels that are above a threshold signal strength as being potential Broadcast Control Channel (BCCH) carriers. To determine whether a strong channel is a BCCH carrier, the wireless device may look to receive a frequency correction burst sent on a Frequency Correction Channel (FCCH). Upon detecting that a channel is a BCCH carrier, the wireless device typically tunes to the carrier frequency. On this frequency, the wireless device may read a Synchronization Channel (SCH) to obtain a base station identity code (BSIC), followed by reading the BCCH to obtain system information (e.g., a PLMN identifier). In this manner, the wireless device may identify available cells in its vicinity.

A conventional wireless device may select a desired PLMN according to one of at least two modes. In automatic mode, the wireless device may automatically choose a PLMN based on the preferred PLMN list, which may be specified by the manufacturer and/or home PLMN operator. In manual mode, the wireless device may be configured to perform a search to find all PLMNs in the vicinity of the device (i.e., a manual PLMN search) and to present to the user a list containing all found PLMNs, from which the user may select a desired PLMN.

In various embodiments, efficiency of a manual PLMN search associated with service acquisition on one SIM of a DSDA wireless communication device may be improved by using a radio resource associated with another SIM to assist the search when available. Specifically, instead of using only the radio resource associated with the SIM attempting service acquisition to search for PLMNs in one or more radio access technologies, upon occurrence of a condition that triggers a PLMN selection for a SIM in manual mode, various embodiments may determine whether another radio resource associated with another SIM is available for use, and if available, may simultaneously perform some of the PLMN search using that other radio resource. For example, various embodiments may determine whether the modem stack associated with the other SIM is in an idle mode, and may use its associated radio resource during times that the radio is ordinarily powered down or otherwise not in use. Therefore various embodiments may provide energy- and time-efficient radio resource use that shortens the amount of time needed to search for all PLMNs in a manual mode search. Further, various embodiments may reduce the need to switch to new radio access technology parameters for searching when the SIM attempting service acquisition supports two or more radio access technologies.

FIG. 1 illustrates a wireless network system 100 suitable for use with various embodiments. Wireless devices 102, 104 may be configured to establish wireless connections with cell towers or base stations of one or more radio access networks. For example, the wireless devices 102, 104 may transmit/receive data using base stations 106, 108, which may be part of a network 110, as is known in the art. The wireless device 102 may further be configured to transmit/receive data through base station 112, which may be part of a different network 114.

The wireless networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, G-3, G-4, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) 116, 118. For example, the base stations 106, 108, the BSC 116, and other components may form the network 110, as is known in the art. Alternate network configurations may also be used and the embodiments are not limited to the configuration illustrated. For example, in another embodiment the functionality of the BSC 116 and at least one of the base stations 106, 108 may be collapsed into a single "hybrid" module having the functionality of these components.

In various embodiments, the wireless device 102 may simultaneously access core networks 120, 122 after camping on cells managed by the base stations 106, 112. The wireless device 102 may also establish connections with Wi-Fi access points, which may connect to the Internet. While various embodiments are particularly useful with wireless networks, the embodiments are not limited to wireless networks and may also be implemented over wired networks with no changes to the methods.

In the wireless network system 100, the wireless device 102 may be a multi-SIM wireless communication device that is capable of operating on a plurality of SIMs. For example, the wireless device 102 may be a dual-SIM wireless communication device. Using dual-SIM functionality, the wireless device 102 may simultaneously access two core networks 120, 122 by camping on cells managed by the base stations 106, 112. The core networks 120, 122 may be interconnected by public switched telephone network (PSTN) 124, across which the core networks 120, 122 may route various incoming and outgoing communications to the wireless device 102.

The wireless device 102 may make a voice or data call to a third party device, such as wireless device 104, using one of the SIMs. The wireless device 102 may also receive a voice call or other data transmission from a third party. The third party device (e.g., wireless device 104) may be any of a variety of devices, including, but not limited to, a mobile phone, laptop computer, PDA, server, etc.).

Some or all of the wireless devices 102 may be configured with multi-mode capabilities and may include multiple transceivers for communicating with different wireless networks over different wireless links/radio access technologies (RATs). For example, the wireless device 102 may be configured to communicate over multiple wireless data networks on different subscriptions, such as in a dual-SIM wireless device. In particular, the wireless device 102 may be configured with dual-SIM dual active (DSDA) capability, which enables a dual-SIM wireless communication device to simultaneously participate in two independent communications sessions, generally though independent transmit/receive chains.

For clarity, while the techniques and embodiments described herein relate to a wireless device configured with at least one GSM subscription, they may be extended to subscriptions on other radio access networks (e.g., UMTS/WCDMA, LTE, CDMA, etc.).

Figure 2:
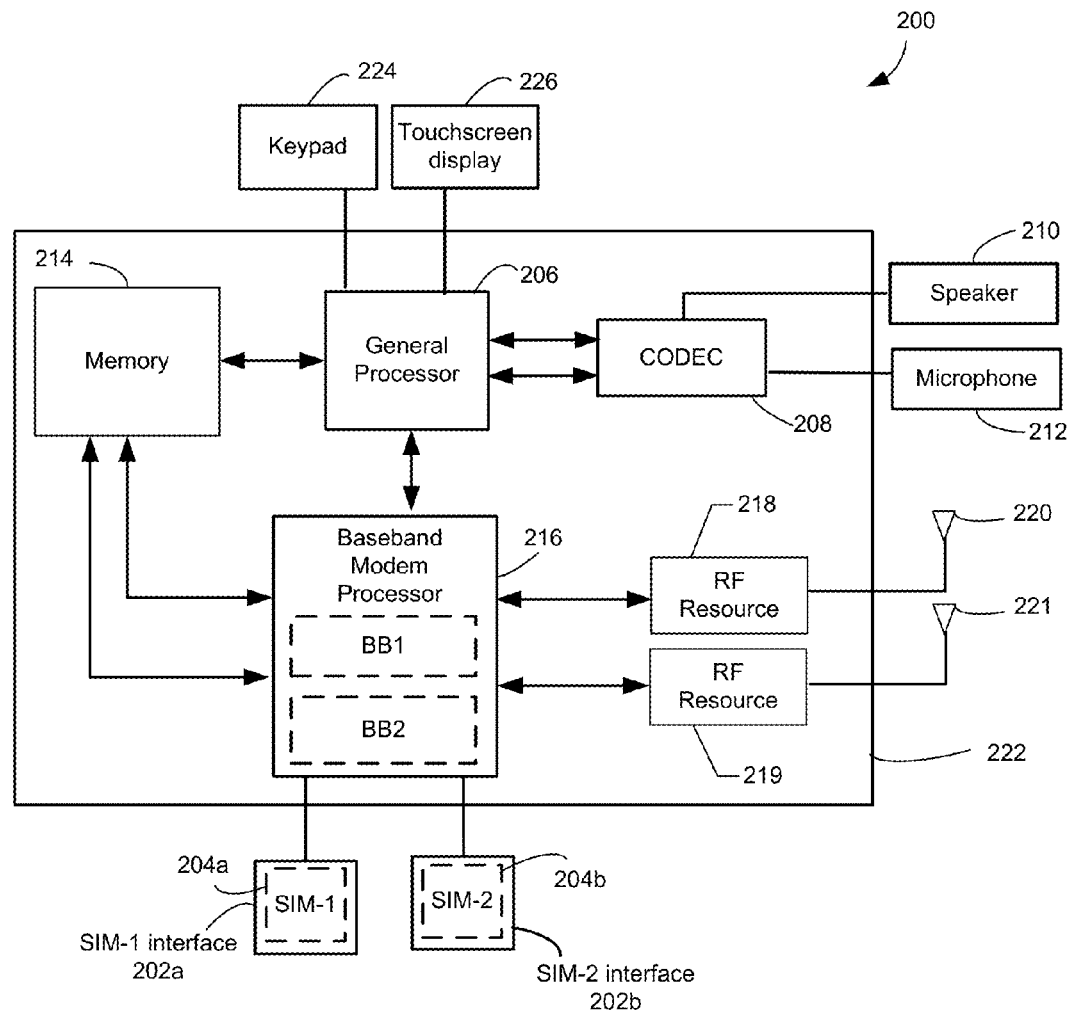
FIG. 2 is a block diagram illustrating a dual-SIM dual active wireless communications device according to various embodiments.

FIG. 2 is a functional block diagram of an example DSDA multi-SIM wireless device 200 that is suitable for implementing various embodiments. According to various embodiments, the wireless device 200 may be similar to one or more of the wireless devices 102, 104 described above with reference to FIG. 1. With reference to FIGS. 1-2, the wireless device 200 may include a first SIM interface 202a, which may receive a first identity module SIM 204a that is associated with the first subscription. The wireless device 200 may also include a second SIM interface 202b, which may receive a second identity module SIM 204b that is associated with the second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204a, 204b may have a CPU, ROM, RAM, EEPROM and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more of the SIMs 204a, 204b for identification.

The wireless device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions.

The general purpose processor 206 and memory 214 may each be coupled to at least one baseband modem processor 216. Each SIM 204a, 204b in the wireless device 200 may be associated with a baseband-RF resource chain that includes a baseband modem processor 216 and a radio resource/RF resource 218, 219. The RF resources 218, 219 may be coupled to antennas 220, 221, and may perform transmit/receive functions for the wireless services associated with each SIM 204a, 204b of the wireless device 200. In some embodiments, the RF resources 218, 219 may be coupled to wireless antennas 220, 221 for sending and receiving RF signals for the SIMs 204a, 204b thereby enabling the wireless device 200 to perform simultaneous communications with separate networks and/or service associated with the SIMs 204a, 204b. The RF resources 218, 219 may provide separate transmit and receive functionality, or may include a transceiver that combines transmitter and receiver functions.

In a particular embodiment, the general purpose processor 206, memory 214, baseband modem processor(s) 216, and RF resources 218, 219 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

Figure 3:
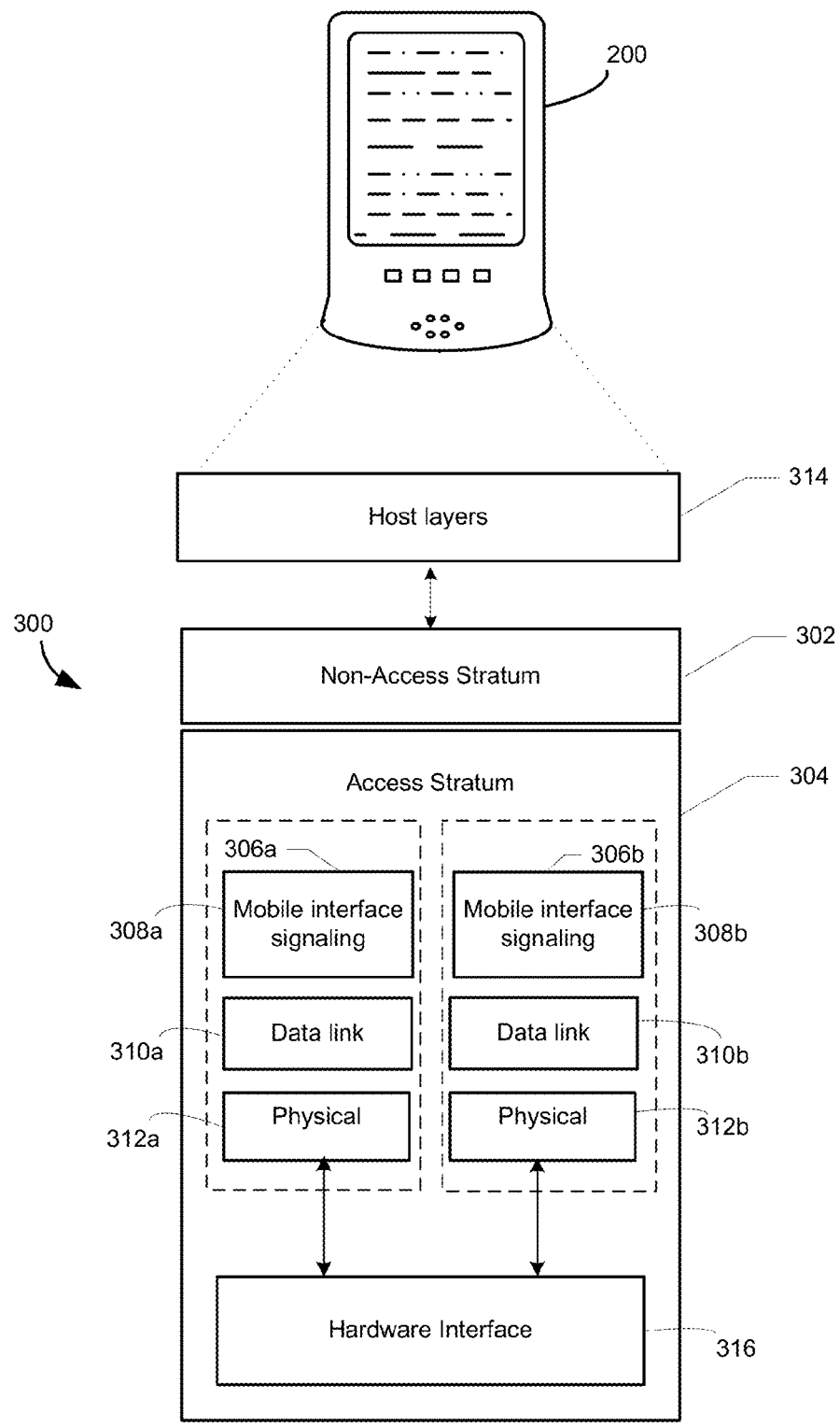
FIG. 3 is a block diagram illustrating example protocol layer stacks in a dual-SIM wireless communication device according to various embodiments.

Referring to FIGS. 1-3, the wireless device 200 may have a layered software architecture 300 to communicate over access networks associated with SIMs. The software architecture 300 may be distributed among one or more processors, such as baseband modem processor(s) 216. The software architecture 300 may also include a Non Access Stratum (NAS) 302 and an Access Stratum (AS) 304. The NAS 302 may include functions and protocols to support traffic and signaling between SIMs of the wireless device 200 (e.g., SIM-1 204a, SIM-2 204b) and their respective core networks. The AS 304 may include functions and protocols that support communication between the SIMs 204a, 204b, and entities of their respective access networks (such as a MSC if in a GSM network).

In the wireless device 200, the AS 304 may include multiple protocol stacks, each of which may be associated with a different SIM. The protocol stacks may be implemented to allow modem operation using information provisioned on multiple SIMs. Therefore, a protocol stack that may be executed by a baseband modem processor (e.g., 216) is interchangeably referred to herein as a modem stack.

In some embodiments, the AS 304 may include protocol stacks 306a, 306b, associated with the SIMs 204a, 204b, respectively. Although described below with reference to GSM-type communication layers, the protocol stacks 306a, 306b may support any of variety of standards and protocols for wireless communications. The protocol stacks 306a, 306b may respectively include mobile interface signaling layers 308a, 308b, which may each be implementations of Layer 3 of a GSM signaling protocol (equivalent to radio resource control layer in implementation of UMTS signaling protocol Layer 3). Further, each of the mobile interface signaling layers 308a, 308b may include at least one sublayer (not shown). Sublayers may include, but are not limited to, connection management (CM) sublayers that provide call management for circuit-switched communications, mobility management (MM) sublayers that may support the mobility of user devices (e.g., location update procedures, IMSI attach/detach etc.), and radio resource management (RR) sublayers that may oversee the establishment of links between the wireless device 200 and associated access networks, including management of the frequency spectrum, channel assignment and handover, power-level control, and signal measurements. In various embodiments, the NAS 302 and RR sublayers may perform the various functions to search for wireless networks.

Residing below the mobile interface signaling layers 308a, 308b, protocol stacks 306a, 306b may also include data link layers 310a, 310b, which may be part of Layer 2 in a GSM signaling protocol. The data link layers 310a, 310b may provide functions to handle incoming and outgoing data across the network, such as dividing output data into data frames and analyzing incoming data to ensure it has been successfully received. In some embodiments, each data link layer 310a, 310b may contain various sub-layers (e.g., media access control (MAC) and logical link control (LLC) layers (not shown)). Residing below the data link layers 310a, 310b, protocol stacks 306a, 306b may also include physical layers 312a, 312b, which may establish connections over the air interface and manage network resources for the wireless device 200.

While the protocol stacks 306a, 306b provide functions to transmit data through physical media, the software architecture 300 may further include at least one host layer 314 to provide data transfer services to various applications in the wireless device 200. In some embodiments, application-specific functions provided by the at least one host layer 314 may provide an interface between the protocol stacks 306a, 306b and the general purpose processor 206. In other embodiments, the protocol stacks 306a, 306b may each include one or more higher-logical layers (e.g., transport, session, presentation, application, etc.) that provide host layer functions. In some embodiments, the software architecture 300 may further include in the AS 304 a hardware interface 316 between the physical layers 312a, 312b and the communication hardware (e.g., one or more RF transceivers).

Separate units of the baseband-modem processor of the multi-SIM wireless device may be implemented as separate structures or as separate logical units within the same structure, and may be configured to execute software including at least two protocol/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

A modem stack may be configured to connect to networks in any of a number of radio access technologies. While described with respect to GSM and/or UMTS networks, these are merely examples of networks that may be searched by radio resources associated with the modem stacks of various embodiments.

In a multi-SIM wireless device, a number of conditions may cause one SIM to lose its network connection, thereby requiring service acquisition, including PLMN selection, on one modem stack/radio resource. For example, following an initial power-up procedure by the wireless device, one of the SIMs may be configured to acquire service in a network that provides much better signal strength or has high-speed connectivity, and may therefore be able to camp on a cell while acquisition of service is still being attempted on another SIM. In other circumstances, a drop off in coverage area of a network to which one SIM is connected may cause it to go out-of-service, while the other SIM maintains its connection with a serving cell in its own network.

Conventionally, a wireless device may attempt to camp each SIM on its preferred cell, which may be performed independently on each SIM in a DSDA device. For example, using independent radio resources, the modem stacks associated with the first and second SIMs (i.e., first modem stack and second modem stack) may acquire carrier frequencies respectively associated with the first SIM and second SIM. Each of the first and second modem stacks may select a suitable PLMN for the associated SIM, determine which of the acquired frequencies advertise the selected PLMN, and choose an appropriate cell to camp on for the each SIM. In particular, the PLMN selection may be performed on the wireless device according to a manual or automatic mode, depending on the settings configured on the device. Upon occurrence of a condition requiring PLMN selection for a SIM (i.e., initial power-on, out-of-service conditions, user input request, etc.), if current settings of the wireless device and/or associated modem stack indicate operation in manual mode, the modem stack may instruct an associated radio resource to perform a search for PLMNs on one or more radio access technology (i.e., a manual PLMN search).

In various embodiments in which a SIM supports more than one radio access technology, the radio resource may search for PLMNs in each radio access technology separately. For example, the radio resource may first search a preferred or recently-acquired radio access technology supported by the SIM, followed by a second radio access technology supported by the SIM, etc. The manual PLMN search may return a comprehensive list of all PLMNs found on acquired frequencies for the technologies enabled by that SIM. Each SIM may be associated with a given set of frequency bands that are associated with PLMNs configured to support that particular SIM. The set of frequency bands enabled for each SIM may be provided by the respective carriers for the SIMs of the wireless device, and may be different, the same, or overlapping.

For example, a search for GSM PLMNs may involve performing a power scan on frequency bands of a GSM network supported by the SIM, identifying channels above a threshold signal strength (e.g., a received signal strength indication (RSSI) of at least −85 dBm), and attempting acquisition of the identified channels. Acquisition of the identified channels may involve attempting to receive control channel information on the identified channels, for example, detecting a tone on a Frequency Correction Channel (FCCH), decoding a burst of a Synchronization Channel (SCH), and reading system information from a BCCH. Finally, a list of PLMNs of the acquired GSM channels may be reported and output.

In a similar process, a search for UMTS PLMNs may involve performing a power scan on frequency bands of a UMTS network supported by the SIM and identifying channels that are above a threshold signal strength. The PLMN search may further involve attempting acquisition on each identified channel by searching for a primary synchronization code (PSC) sequence sent on a primary synchronization channel (SCH) for each identified channel by correlating received samples with a locally generated PSC sequence at different time offsets. Acquisition may further involve using PSC sequences found to detect and ascertain the slot timing of a UMTS cell, determining a pattern of secondary synchronization code (SSC) sequences used by each UMTS cell for which the PSC has been detected, and determining frame timing and primary scrambling code used for each UMTS cell based on the detected SSC pattern for that cell. Using the PSC, a primary Common Control Physical Channel (P-CCPCH) may be detected, from which system information (e.g., a PLMN identifier) may be read. A list of PLMN identifiers of acquired UMTS channels may be reported.

In a DSDA device, since PLMN searches and selections are performed separately on each SIM, one SIM (e.g., a first SIM) may be attempting acquisition of service, including searching for PLMNs in its vicinity, after another SIM has already camped on a cell and entered idle mode. Further, both SIM modem stacks may simultaneously attempt to acquire service, including searching for PLMNs using respective associated radio resources.

Once in idle mode, a SIM may implement a power-saving mode that includes a cycle of sleep and awake states (e.g., discontinuous reception (DRX)). A modem stack in such power-saving mode may monitor paging channels/receive network pages (i.e., radio use) during the awake state, and may power off most processes and components, including the associated radio resource, during the sleep state. Therefore, for a substantial portion of time in idle mode, an associated radio resource may be unused.

The SIM for which service has been lost may support multiple radio access technologies, and therefore may require searching/scanning frequencies of multiple radio access technologies in the process of searching for PLMNs. As a result, the amount of time and power needed to complete the PLMN search may be increased. Moreover, additional delay and power use may be added for each switch to a different radio access technology that may be required to complete the PLMN search.

Various embodiments may implement the availability of a radio resource associated with an idle mode SIM by repurposing the radio resource associated with the idle mode SIM to assist another SIM in performing the manual PLMN search. For instance, during the periods of sleep in idle mode on a second SIM, the associated radio resource may be used in the manual PLMN search of a first SIM by performing a portion of the PLMN search in parallel with the search on the first radio resource. In various embodiments, a portion of the frequencies to be searched may be assigned to each of two radio resources in advance, which may perform power scans on their respective assigned frequencies to locate strong signals, and read system information to identify PLMNs. Resulting PLMNs found in the frequencies scanned by the second radio resource may be combined with those found by the first radio resource, which may be output to a user as a manual PLMN list. In various embodiments, if the first SIM supports multiple radio access networks (e.g., GSM/WCDMA), one of which is also supported by the second SIM (e.g., GSM), the radio resource of the second SIM may be used to scan frequencies for channels of that radio access technology, while the first SIM radio resource may scan frequencies for channels of a different radio access technology. In this manner, the additional time to switch between radio access technologies is reduced. Alternatively, if the first and second SIMs each support the same radio access technology, the frequencies to be scanned may be divided between the first and second radio resources.

Figure 4A:
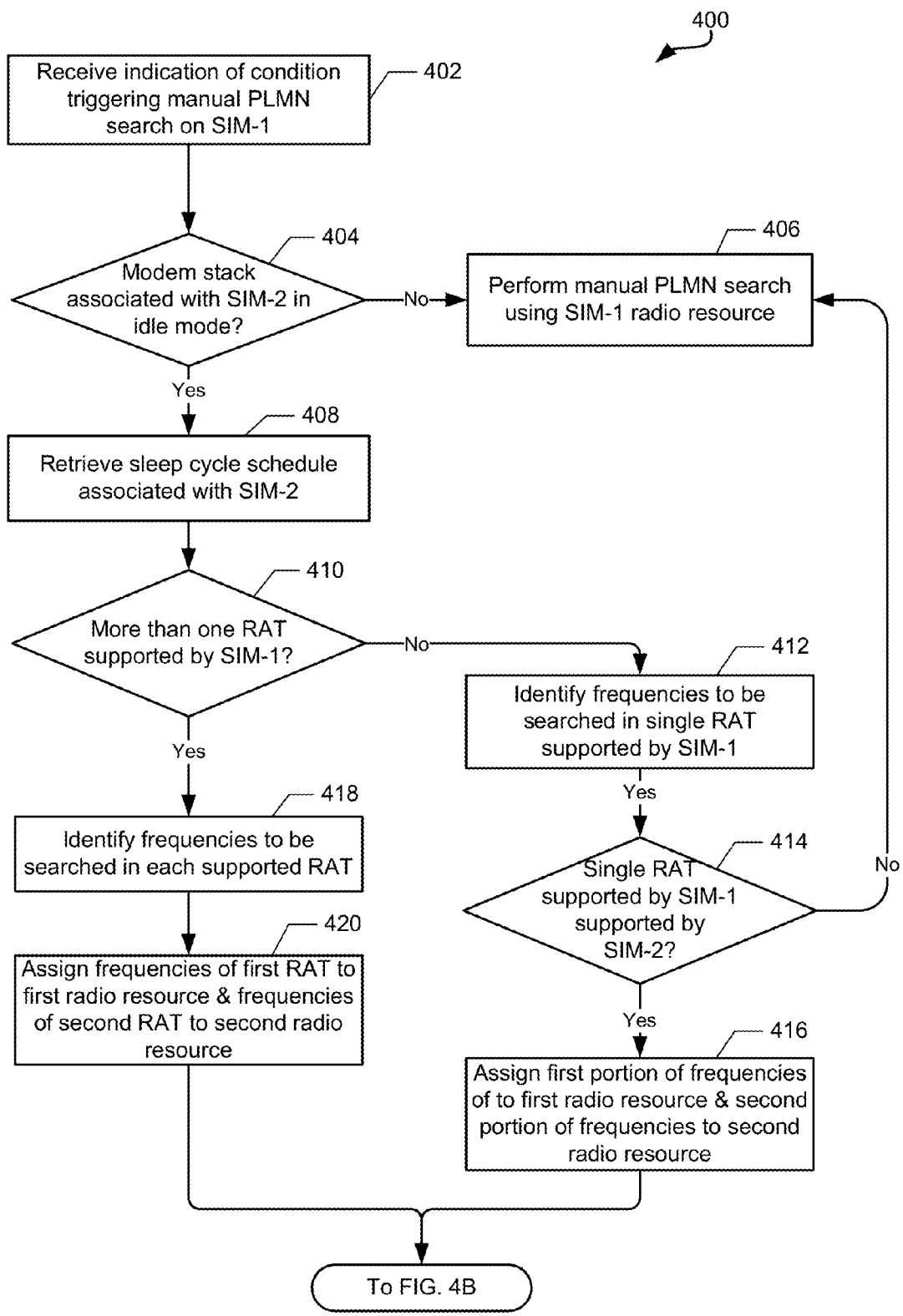
FIGS. 4A and 4B are process flow diagrams illustrating a method for improving service acquisition for a SIM in an example dual-SIM wireless communication device according to various embodiments.
Figure 4B:
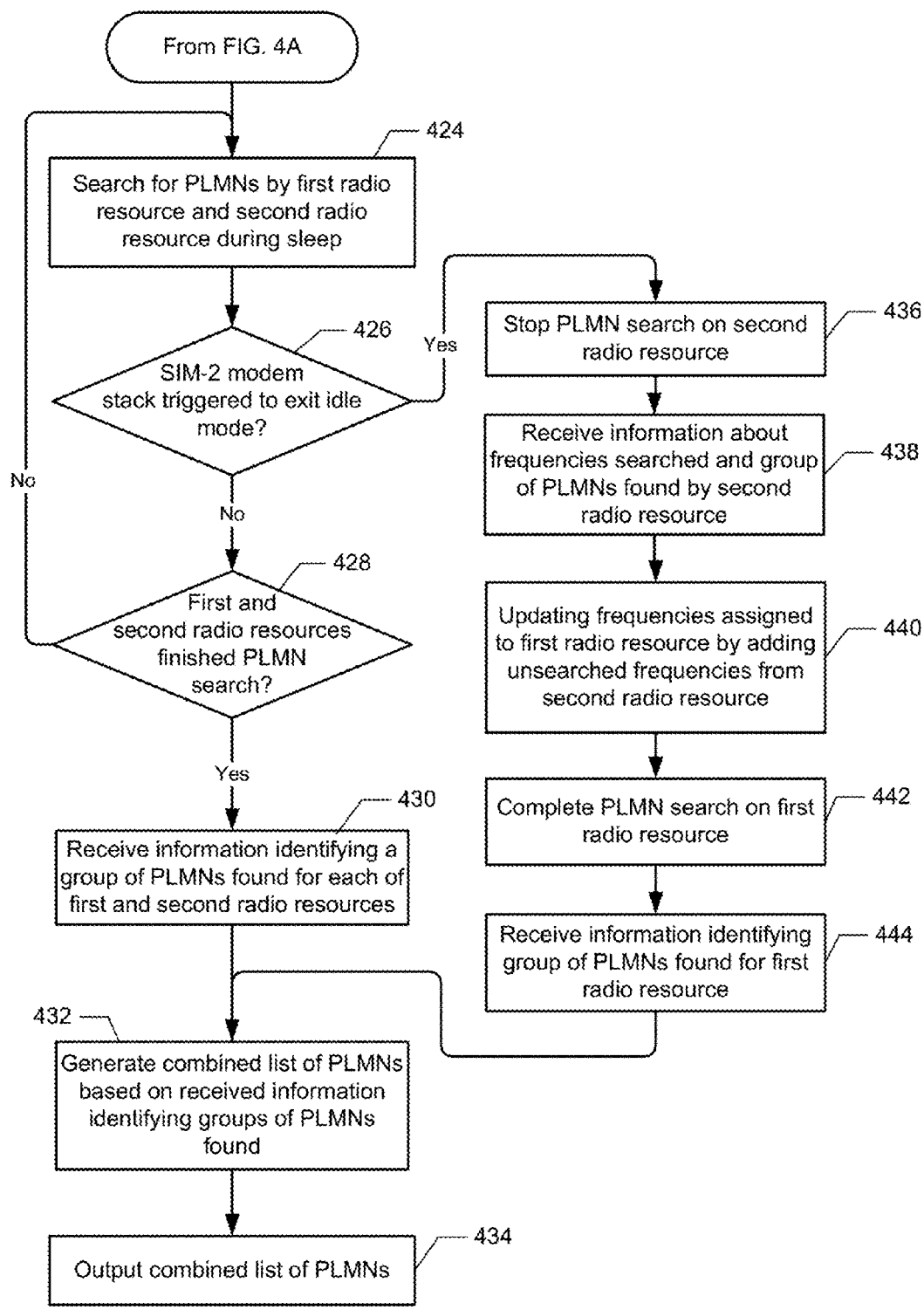

FIGS. 4A and 4B illustrate a method 400 for improving efficiency in conducting a manual mode search for PLMNs associated with a first SIM of a DSDA device by utilizing the radio resource associated with a second SIM to simultaneously perform part of the search when available. With reference to FIGS. 1-4B in various embodiments, the operations of method 400 may be implemented by one or more processors of the wireless device 200, such as the general purpose processor 206 and/or baseband modem processor(s), or a separate controller (not shown) that may be coupled to memory and to the baseband modem processor(s) 216.

In block 402, the wireless device processor may receive an indication of a condition triggering a manual PLMN search for networks supported by a first SIM ("SIM-1"). For example, the wireless device processor may be notified that the modem stack associated with the first SIM has exited idle mode due to an out-of-service condition, and manual mode is currently implemented in settings saved on the first SIM.

In determination block 404, the wireless device processor may determine whether a modem stack associated with a second SIM ("SIM-2") in the DSDA device is presently in idle mode. References herein to the first SIM or SIM-1 and the second SIM or SIM-2 are arbitrary and for ease of description and reference purposes only, as the wireless device processor may assign any indicator, name or other designation to differentiate the SIMs based on the associated modem stack that has experienced a condition triggering a manual PLMN search. Further, while the embodiment descriptions refer to the modem stack associated with the second SIM assisting in the search for networks supported by the first SIM, the embodiments apply equally to the modem stack associated with the first SIM assisting in the search for networks supported by the second SIM. For example, at one moment the second SIM may assist in the search for networks supported by the first SIM, while a few minutes later the first SIM may assist in the search for networks supported by the second SIM.

In response to determining that the modem stack associated with the second SIM is not in idle mode (i.e., determination block 404="No"), the manual PLMN search may be performed by a radio resource associated with the first SIM ("first radio resource") per normal operation in block 406. In response to determining that the modem stack associated with the second SIM is in idle mode (i.e., determination block 404="Yes"), the wireless device processor may retrieve information about a sleep cycle schedule in a power-saving mode for the modem stack and radio resource associated with the second SIM ("second radio resource") in block 408. Such information may be derived from parameters sent by the network in which the second SIM modem stack has registered, for example, a starting time and periodicity of a power-saving mode (e.g., DRX) cycle, as well as an inactivity timer that dictates the duration of wakeup time if no page is received. In some embodiments, the wireless device processor may retrieve the sleep cycle schedule information by querying the modem stack associated with the second SIM, directly accessing non-volatile memory associated with the second SIM, accessing a separate data storage on the wireless device, etc.

In determination block 410, the wireless device processor may determine whether the first SIM is configured to support service on networks of more than one radio access technology. In some embodiments, the radio access technologies supported by each SIM may be provisioned by a service provider/system operator. Identifying supported radio access technologies may be performed by accessing non-volatile memory within (or associated with) the first SIM, that may store such information.

In various embodiments, the first SIM may be configured to operate such that the associated modem stack may receive service from networks using one radio access technology (e.g., GSM-only service, UMTS-only service, etc.). Alternatively, in various embodiments the first SIM may be configured to operate in at least a dual mode, allowing the associated modem stack to receive service from networks using two (or more) different radio access technologies (e.g., GSM or UMTS service).

In response to determining that the first SIM is not configured to support service on networks of more than one radio access technology (i.e., determination block 410="No"), the wireless device processor may identify the frequencies to be searched by identifying enabled frequency bands corresponding to the single supported radio access technology, and the channels (e.g., ARFCNs, UARFCNs, etc.) of that radio access technology that are within each band in block 412. In various embodiments, the enabled frequency band(s) may be dependent on one or more capabilities of the radio resource or other wireless device components, on configurations stored in the first SIM, and/or on other factors. Enabled bands may include various groups of bands, for example, the cellular and PCS bands (which are commonly used in the United. States), includes the IMT-2000 and GSM 1800 bands (which are commonly used in Europe), or some other group of frequency bands. In order to identify the enabled bands, for example, the wireless device processor may access the non-volatile memory associated with the first SIM, which may indicate the enabled frequency bands (and the ARFCNs/UARFCNs/channels in each band).

In determination block 414, the wireless device processor may determine whether the single RAT supported by the first SIM is also supported by the second SIM, for example. In some embodiments, the wireless device processor may access non-volatile memory associated with the second SIM to identify supported radio access technologies. In response to determining that the single radio access technology supported by the first SIM is not supported by the second SIM (i.e., determination block 414="No"), the wireless device processor may return to block 406 to perform the manual PLMN search using the radio resource associated with the first SIM. In response to determining that the single radio access technology supported by the first SIM is supported by the second SIM (i.e., determination block 414="Yes"), then in block 416 the wireless device processor may assign a first portion (e.g., approximately half) of the frequencies to be searched to the radio resource associated with the first SIM and may assign a second portion (e.g., approximately half) of the frequencies to be searched to the radio resource associated with the second SIM. Some embodiments, a different allocation of frequencies between the first and second radio resources may be implemented. The wireless device processor may proceed to block 424 (FIG. 4B).

In response to determining that the first SIM is configured to support receiving service on networks of more than one radio access technology (i.e., determination block 410="Yes"), the wireless device processor may identify the frequencies to be searched on each radio access technology in block 418, such as by identifying enabled frequency bands corresponding to each radio access technology, and the channels that are within each band. In some embodiments, the wireless device processor may access non-volatile memory associated with the first SIM to identify supported radio access technologies, and the corresponding enabled frequency bands (and ARFCNs/UARFCNs/channels in each band).

In block 420, the wireless device processor may assign frequencies to be searched for a first radio access technology to the first radio resource, and assign frequencies to be searched for a second radio access technology to the second radio resource. In order to make such assignment, in various embodiments, the wireless device processor may assume that the second SIM supports only a subset of radio access technologies supported by the first SIM. In some examples, the specific subset may be a default setting according to which radio access technology supported by the first SIM is most likely to be universally supported. For example, if the first SIM supports both UMTS/WCDMA and GSM, the wireless device processor may assume that the second SIM supports at least GSM, which may be the default setting for assignment to the second radio resource. The wireless device processor may proceed to block 424.

As discussed above, by assigning the frequencies in a radio access technology to the same radio resource, the additional time/power expenditure involved in switching between radio access technologies for searching may be reduced. Further, by assigning to the second radio resource frequencies associated with a supported radio access technology, efficiencies may be gained in the search on the second radio resource by using existing hardware and/or software configurations that have been established by the second SIM modem stack in enabling its own network connections.

In block 424, the wireless device processor may prompt the first radio resource to search for PLMNs, and the second radio resources to search for PLMNs during sleep periods of its power saving mode cycle, by implementing the scanning and identification operations discussed above. In various embodiments, the particular PLMN search procedures may depend on the radio access technology associated with channels of the particular frequencies to be searched.

In determination block 426, the wireless device processor may determine whether the second SIM modem stack has been triggered to exit idle mode. For example, the modem stack associated with the second SIM may receive a paging request/message during the wakeup period of its power saving mode cycle, begin call setup procedures for a mobile originating call in response to user input, etc.

In response to determining that the second SIM modem stack has not been triggered to exit idle mode (i.e., determination block 426="No"), the wireless device processor may determine whether the first and second radio resources have finished searching for PLMNs on their respective assigned frequencies in determination block 428. In response to determining that the first and second radio resources have not finished searching for PLMNs (i.e., determination block 428="No"), the wireless device processor may continue the PLMN search in block 424, for example, until the first and second radio resources finish searching for PLMNs or the second SIM modem stack is triggered to exit idle mode.

In response to determining that the first and second radio resources have finished searching for PLMNs on their respective assigned frequencies (i.e., determination block 428="Yes"), the wireless device processor may receive information identifying a group of PLMNs found by each of the first and second radio resource in block 430. Each group may contain zero, one, or a plurality of PLMN identifiers. In block 432, the wireless device processor may generate a combined list of PLMNs based on the received information identifying the groups of PLMNs found by the first and second radio resources. In some embodiments, such as when the first and second radio resources were each searching for channels in the same radio access technology, the wireless device may implement an operation to eliminate from the combined list any repetition of PLMN identifiers found by both the first and second radio resources. In block 434, the wireless device processor may prompt output of the combined list of PLMNs as the results of the manual PLMN search.

In response to determining that the second SIM modem stack has been triggered to leave idle mode (i.e., determination block 426="Yes"), the wireless device processor may stop the PLMN search on the second radio resource in block 436. In block 438, the wireless device processor may receive information indicating the frequencies assigned to the second radio resource that were already searched (i.e., a completed portion), as well as a group of PLMNs that were found by the search of those frequencies. In block 440, the wireless device processor may add any unsearched frequencies from those assigned to the second radio resource to the existing frequencies to be searched by the first radio resource, thereby updating the frequencies to be searched by the first radio resource.

In block 442, the wireless device processor may prompt the first radio resource to complete the PLMN search on all frequencies now assigned to be searched by the first radio resource. In block 444, the wireless device processor may receive information identifying a group of PLMNs that were found in the search by the first radio resource. The wireless device processor may again generate the combined list of PLMNs based on the search by the first radio resource and the partial search by the second radio resource in block 432.

As discussed above, the references to first SIM/SIM-1 and second SIM/SIM-2, as well as to a first radio resource, second radio resource, etc., are arbitrary, and may apply to either or any SIM and/or radio resource of the wireless device. For example, while various embodiments and claims refer to performing a PLMN search triggered for the first SIM, assisted by an idle mode radio resource for the second SIM, the various embodiments and claims are equally applicable to performing a PLMN search triggered for the second SIM assisted by an idle mode radio resource for the first SIM. Further, such designations of SIMs and/or radio resources may be switched or reversed between instances of executing the methods herein.

Figure 5:
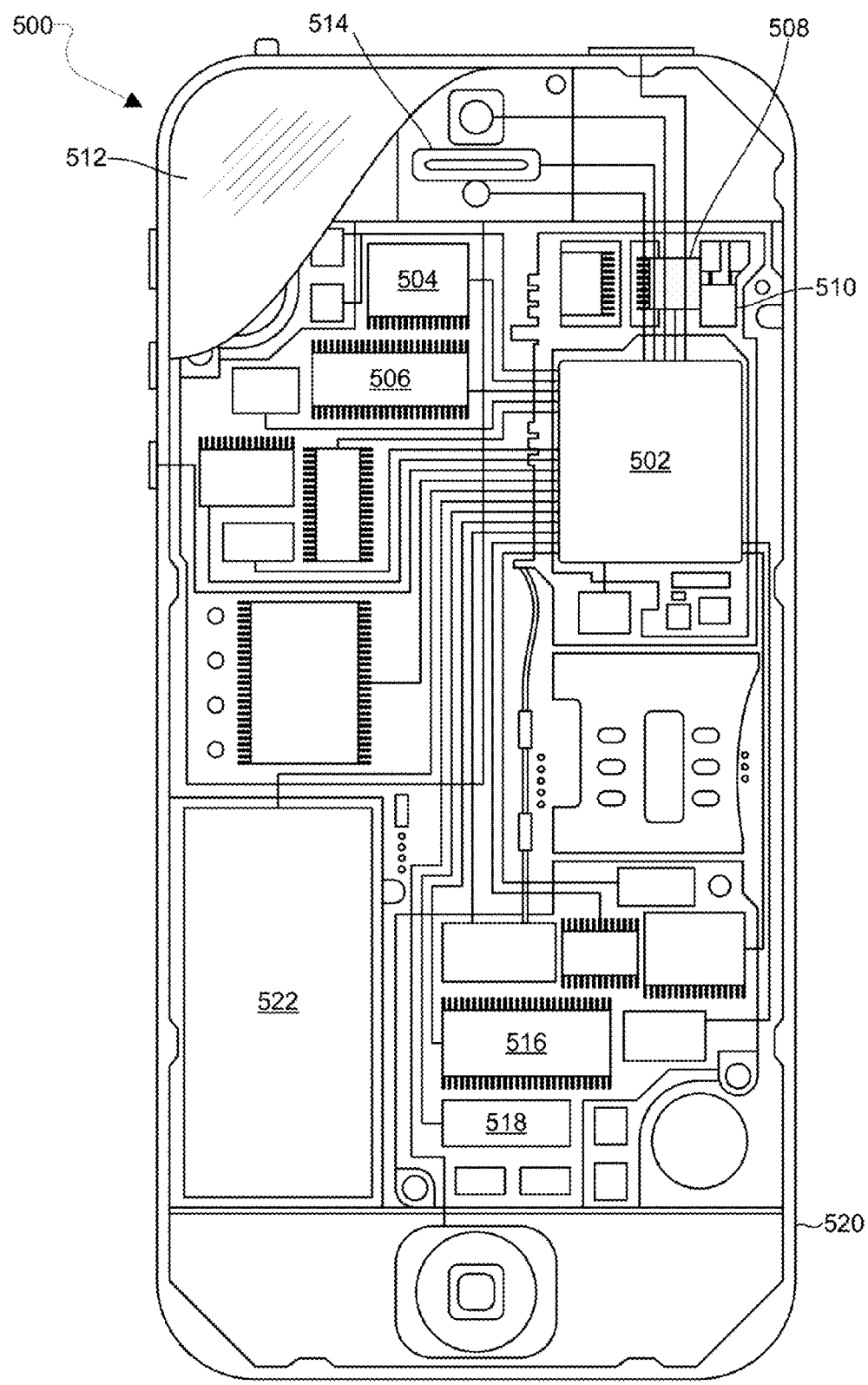
FIG. 5 is a component diagram of an example wireless device suitable for use with various embodiments.

Various embodiments may be implemented in any of a variety of wireless devices, an example of which is illustrated in FIG. 5. For example, the wireless device 500 (which may correspond, for example, the wireless device 200 in FIG. 2) may include a processor 502 coupled to a touchscreen controller 504 and an internal memory 506. The processor 502 may be one or more multicore ICs designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The multicore device 500 may include a cellular network wireless modem chip 516 that enables communication via a cellular network and is coupled to the processor. The multicore device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The multicore device 500 may also include speakers 514 for providing audio outputs. The multicore device 500 may also include a housing 520, constructed of a plastic, metal, or a combination of materials, for containing all or some of the components discussed herein. The multicore device 500 may include a power source 522 coupled to the processor 502, such as a disposable or rechargeable battery. The rechargeable battery may also be coupled to the peripheral device connection port to receive a charging current from a source external to the multicore device 500.

Figure 6:
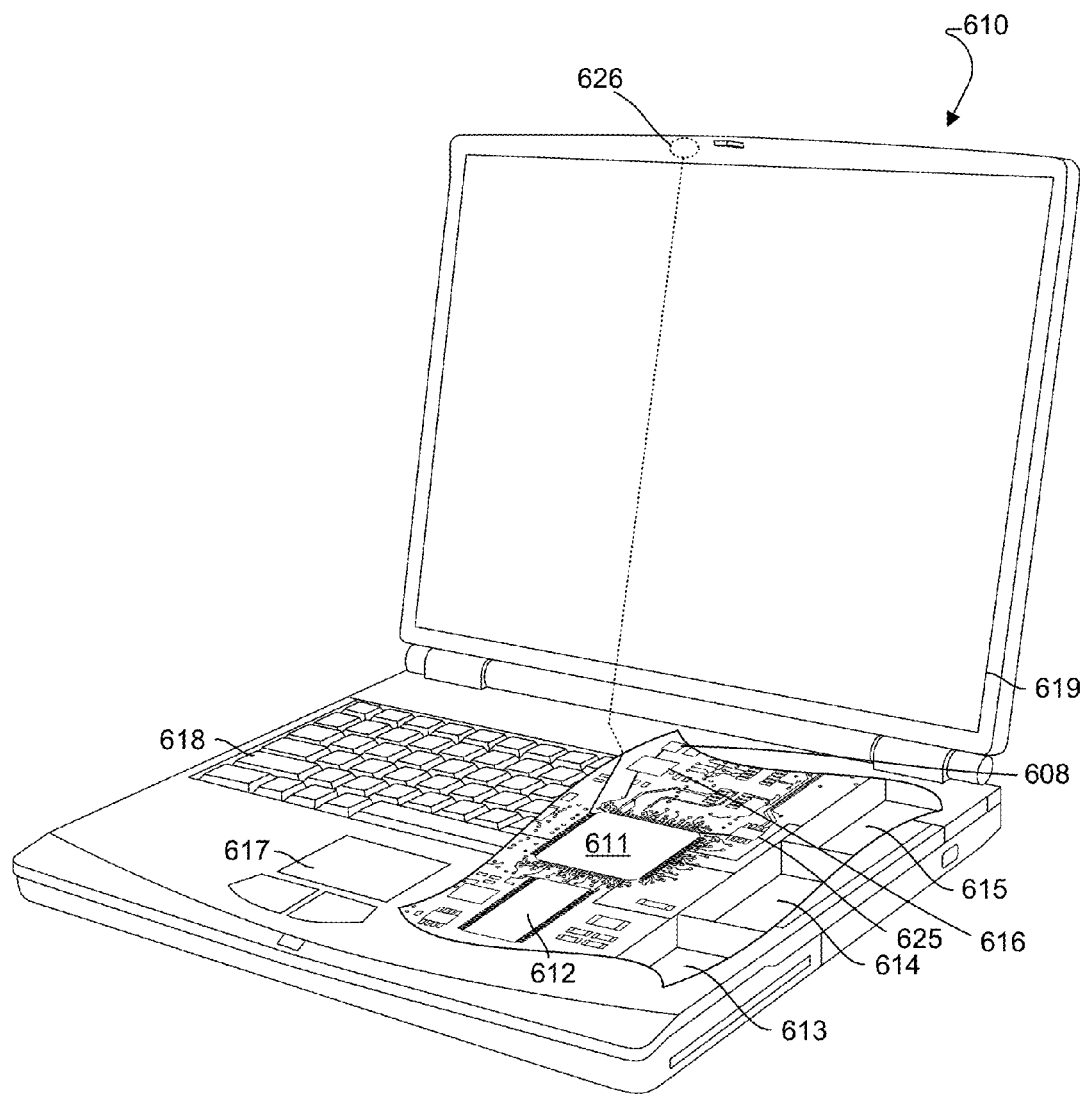
FIG. 6 is a component diagram of another example wireless device suitable for use with various embodiments.

Various embodiments described above may also be implemented within a variety of personal computing devices, such as a laptop computer 600 (which may correspond, for example, the wireless device 200 in FIG. 2) as illustrated in FIG. 6. Many laptop computers include a touch pad touch surface 617 that serves as the computer's pointing device, and thus may receive drag, scroll, and flick gestures similar to those implemented on wireless computing devices equipped with a touch screen display and described above. A laptop computer 600 will typically include a processor 611 coupled to volatile memory 612 and a large capacity nonvolatile memory, such as a disk drive 613 of Flash memory. The computer 600 may also include a floppy disc drive 614 and a compact disc (CD) drive 615 coupled to the processor 611. The computer 600 may also include a number of connector ports coupled to the processor 611 for establishing data connections or receiving external memory devices, such as a USB or FireWire® connector sockets, or other network connection circuits for coupling the processor 611 to a network.

In a notebook configuration, the computer housing includes the touchpad 617, the keyboard 618, and the display 619 all coupled to the processor 611. Other configurations of the computing device may include a computer mouse or trackball coupled to the processor (e.g., via a USB input) as are well known, which may also be use in conjunction with various embodiments.

The processors 502 and 611 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of improving service acquisition on a first subscriber identification module (SIM) of a multi-SIM wireless communication device having at least the first SIM associated with a first radio resource and a second SIM associated with a second radio resource, comprising:
   detecting a condition triggering a public mobile land network (PLMN) selection associated with the first SIM;
   receiving an indication that service acquisition settings of the first SIM are set to a manual mode;
   determining whether a modem stack associated with the second SIM is in idle mode; and
   in response to determining that the modem stack associated with the second SIM is in idle mode:
      identifying timing of a power-saving mode cycle implemented by the modem stack associated with the second SIM; and
      performing a PLMN search using the first and second radio resources.

2. The method of claim 1, wherein performing the PLMN search using the first and second radio resources comprises:
   determining whether the first SIM supports multiple radio access technologies; and
   in response to determining that the first SIM supports multiple radio access technologies:
      assigning frequencies associated with a first one of the multiple radio access technologies to the first radio resource; and
      assigning frequencies associated with a second one of the multiple radio access technologies to the second radio resource.

3. The method of claim 2, wherein performing the PLMN search using the first and second radio resources further comprises:
   identifying frequencies associated with a single radio access technology supported by the first SIM in response to determining that the first SIM does not support multiple radio access technologies; and
   determining whether the single radio access technology supported by the first SIM is also supported by the second SIM.

4. The method of claim 3, wherein performing the PLMN search using the first and second radio resources further comprises:
   assigning a first portion of the identified frequencies to the first radio resource and a second portion of the identified frequencies to the second radio resource in response to determining that the single radio access technology supported by the first SIM is also supported by the second SIM.

5. The method of claim 2, further comprising:
   scanning, by the first radio resource, frequencies associated with a first one of the multiple radio access technologies to identify channels that satisfy a signal strength threshold;
   scanning, by the second radio resource during a sleep period of the power-saving mode cycle, frequencies associated with a second one of the multiple radio access technologies to identify channels that satisfy the signal strength threshold;
   receiving a first group and a second group of identified PLMNs based on system information read from each channel identified by each of the first and second radio resource;
   determining whether all assigned frequencies have been scanned;
   generating a combined list of PLMNs based on the first and second groups of identified PLMNs in response to determining that all frequencies have been scanned; and
   outputting the combined list of PLMNs.

6. The method of claim 1, wherein performing the PLMN search using the first and second radio resources comprises:
   scanning, by the first radio resource, a first set of assigned frequencies to identify channels that satisfy a signal strength threshold;
   scanning, by the second radio resource during a sleep period of the power-saving mode cycle, a second set of assigned frequencies to identify channels that satisfy the signal strength threshold;
   receiving a first group and a second group of identified PLMNs based on system information read from each identified channel in the respective first set and second set of assigned frequencies;

determining whether all frequencies in the first and second sets of assigned frequencies have been scanned;

generating a combined list of PLMNs based on the first and second groups of identified PLMNs in response to determining that all frequencies in the first and second sets of assigned frequencies have been scanned; and outputting the combined list of PLMNs.

7. The method of claim 6, further comprising:

determining whether the modem stack associated with the second SIM is exiting idle mode;

stopping the scanning of the second set of assigned frequencies by the second radio resource in response to determining that the modem stack associated with the second SIM is exiting idle mode;

identifying a completed portion of the second set of assigned frequencies already scanned by the second radio resource, wherein the received second group of identified PLMNs is based on the system information read from the identified channels in the completed portion of the second set of assigned frequencies; and adding a remaining unsearched portion of the second set of assigned frequencies to the first set of assigned frequencies, wherein an updated first set of assigned frequencies is created.

8. The method of claim 7, wherein scanning, by the first radio resource, the first set of assigned frequencies to identify frequency channels that satisfy a signal strength threshold comprises scanning the updated first set of assigned frequencies.

9. A wireless communication device, comprising:

a first radio resource associated with a first subscriber identification module (SIM);

a second radio resource associated with a second SIM; and a processor coupled to the first and second SIMs and respective first and second radio resources, wherein the processor is configured to:

detect a condition triggering a public mobile land network (PLMN) selection associated with the first SIM;

receive an indication that service acquisition settings of the first SIM are set to a manual mode;

determine whether a modem stack associated with the second SIM is in idle mode; and in response to determining that the modem stack associated with the second SIM is in idle mode:

identify timing of a power-saving mode cycle implemented by the modem stack associated with the second SIM; and perform a PLMN search using the first and second radio resources.

10. The wireless communication device of claim 9, wherein the processor is further configured to:

determine whether the first SIM supports multiple radio access technologies; and in response to determining that the first SIM supports multiple radio access technologies:

assign frequencies associated with a first one of the multiple radio access technologies to the first radio resource; and assign frequencies associated with a second one of the multiple radio access technologies to the second radio resource.

11. The wireless communication device of claim 10, wherein the processor is further configured to:

identify frequencies associated with a single radio access technology supported by the first SIM in response to determining that the first SIM does not support multiple radio access technologies; and determine whether the single radio access technology supported by the first SIM is also supported by the second SIM.

12. The wireless communication device of claim 11, wherein the processor is further configured to:

assign a first portion of the identified frequencies to the first radio resource and a second portion of the identified frequencies to the second radio resource in response to determining that the single radio access technology supported by the first SIM is also supported by the second SIM.

13. The wireless communication device of claim 10, wherein the processor is further configured to:

scan, by the first radio resource, frequencies associated with a first one of the multiple radio access technologies to identify channels that satisfy a signal strength threshold;

scan, by the second radio resource during a sleep period of the power-saving mode cycle, frequencies associated with a second one of the multiple radio access technologies to identify channels that satisfy the signal strength threshold;

receive a first group and a second group of identified PLMNs based on system information read from each channel identified by each of the first and second radio resource;

determine whether all assigned frequencies have been scanned;

generate a combined list of PLMNs based on the first and second groups of identified PLMNs in response to determining that all frequencies have been scanned; and output the combined list of PLMNs.

14. The wireless communication device of claim 9, wherein the processor is further configured to:

scan, by the first radio resource, a first set of assigned frequencies to identify channels that satisfy a signal strength threshold;

scan, by the second radio resource during a sleep period of the power-saving mode cycle, a second set of assigned frequencies to identify channels that satisfy the signal strength threshold;

receive a first group and a second group of identified PLMNs based on system information read from each identified channel in the respective first set and second set of assigned frequencies;

determine whether all frequencies in the first and second sets of assigned frequencies have been scanned;

generate a combined list of PLMNs based on the first and second groups of identified PLMNs in response to determining that all frequencies in the first and second sets of assigned frequencies have been scanned; and output the combined list of PLMNs.

15. The wireless communication device of claim 14, wherein the processor is further configured to:

determine whether the modem stack associated with the second SIM is exiting idle mode;

stop the scanning of the second set of assigned frequencies by the second radio resource in response to determining that the modem stack associated with the second SIM is exiting idle mode;

identify a completed portion of the second set of assigned frequencies already scanned by the second radio resource, wherein the received second group of identified PLMNs is based on the system information read from the identified channels in the completed portion of the second set of assigned frequencies; and add a remaining unsearched portion of the second set of assigned frequencies to the first set of assigned frequencies, wherein an updated first set of assigned frequencies is created.

16. The wireless communication device of claim 15, wherein the processor is further configured to scan the updated first set of assigned frequencies.

17. A wireless communication device, comprising:
means for detecting a condition triggering a public mobile land network (PLMN) selection associated with a first subscriber identification module (SIM), wherein the first SIM is associated with a first radio resource;
means for receiving an indication that service acquisition settings of the first SIM are set to a manual mode;
means for determining whether a modem stack associated with a second SIM is in idle mode, wherein the second SIM is associated with a second radio resource; and
in response to determining that the modem stack associated with the second SIM is in idle mode, means for:
identifying timing of a power-saving mode cycle implemented by the modem stack associated with the second SIM; and
performing a PLMN search using the first and second radio resources.

18. A non-transitory processor-readable medium having stored thereon processor-executable instructions configured to cause a wireless communication device processor to perform operations comprising:
detecting a condition triggering a public mobile land network (PLMN) selection associated with a first subscriber identification module (SIM), wherein the first SIM is associated with a first radio resource;
receiving an indication that service acquisition settings of the first SIM are set to a manual mode;
determining whether a modem stack associated with a second SIM is in idle mode, wherein the second SIM is associated with a second radio resource; and
in response to determining that the modem stack associated with the second SIM is in idle mode:
identifying timing of a power-saving mode cycle implemented by the modem stack associated with the second SIM; and
performing a PLMN search using the first and second radio resources.

19. The non-transitory processor-readable medium of claim 18, wherein the stored processor-executable instructions are configured to cause the wireless communication device processor to perform operations such that performing the PLMN search using the first and second radio resources comprises:
determining whether the first SIM supports multiple radio access technologies; and
in response to determining that the first SIM supports multiple radio access technologies:
assigning frequencies associated with a first one of the multiple radio access technologies to the first radio resource; and
assigning frequencies associated with a second one of the multiple radio access technologies to the second radio resource.

20. The non-transitory processor-readable medium of claim 19, wherein the stored processor-executable instructions are configured to cause the wireless communication device processor to perform operations such that performing the PLMN search using the first and second radio resources further comprises:
identifying frequencies associated with a single radio access technology supported by the first SIM in response to determining that the first SIM does not support multiple radio access technologies; and
determining whether the single radio access technology supported by the first SIM is also supported by the second SIM.

21. The non-transitory processor-readable medium of claim 20, wherein the stored processor-executable instructions are configured to cause the wireless communication device processor to perform operations such that performing the PLMN search using the first and second radio resources further comprises:
assigning a first portion of the identified frequencies to the first radio resource and a second portion of the identified frequencies to the second radio resource in response to determining that the single radio access technology supported by the first SIM is also supported by the second SIM.

22. The non-transitory processor-readable medium of claim 19, wherein the stored processor-executable instructions are configured to cause the wireless communication device processor to perform operations further comprising:
scanning, by the first radio resource, frequencies associated with a first one of the multiple radio access technologies to identify channels that satisfy a signal strength threshold;
scanning, by the second radio resource during a sleep period of the power-saving mode cycle, frequencies associated with a second one of the multiple radio access technologies to identify channels that satisfy the signal strength threshold;
receiving a first group and a second group of identified PLMNs based on system information read from each channel identified by each of the first and second radio resource;
determining whether all assigned frequencies have been scanned;
generating a combined list of PLMNs based on the first and second groups of identified PLMNs in response to determining that all frequencies have been scanned; and
outputting the combined list of PLMNs.

23. The non-transitory processor-readable medium of claim 18, wherein the stored processor-executable instructions are configured to cause the wireless communication device processor to perform operations such that performing the PLMN search using the first and second radio resources comprises:
scanning, by the first radio resource, a first set of assigned frequencies to identify channels that satisfy a signal strength threshold;
scanning, by the second radio resource during a sleep period of the power-saving mode cycle, a second set of assigned frequencies to identify channels that satisfy the signal strength threshold;
receiving a first group and a second group of identified PLMNs based on system information read from each identified channel in the respective first set and second set of assigned frequencies;
determining whether all frequencies in the first and second sets of assigned frequencies have been scanned;
generating a combined list of PLMNs based on the first and second groups of identified PLMNs in response to determining that all frequencies in the first and second sets of assigned frequencies have been scanned; and
outputting the combined list of PLMNs.

24. The non-transitory processor-readable medium of claim 23, wherein the stored processor-executable instructions are configured to cause the wireless communication device processor to perform operations further comprising:
- determining whether the modem stack associated with the second SIM is exiting idle mode;
- stopping the scanning of the second set of assigned frequencies by the second radio resource in response to determining that the modem stack associated with the second SIM is exiting idle mode;
- identifying a completed portion of the second set of assigned frequencies already scanned by the second radio resource, wherein the received second group of identified PLMNs is based on the system information read from the identified channels in the completed portion of the second set of assigned frequencies; and
- adding a remaining unsearched portion of the second set of assigned frequencies to the first set of assigned frequencies, wherein an updated first set of assigned frequencies is created.

25. The non-transitory processor-readable medium of claim 24, wherein the stored processor-executable instructions are configured to cause the wireless communication device processor to perform operations such that scanning, by the first radio resource, the first set of assigned frequencies to identify frequency channels that satisfy a signal strength threshold comprises scanning the updated first set of assigned frequencies.

\* \* \* \* \*